US012547308B2

(12) United States Patent
Bruse et al.

(10) Patent No.: US 12,547,308 B2
(45) Date of Patent: Feb. 10, 2026

(54) PROACTIVE MODIFICATION OR SUGGESTION OF ASSISTANT ROUTINES BASED ON ANTICIPATED ENERGY CONSUMPTION

(71) Applicant: GOOGLE LLC, Mountain View, CA (US)

(72) Inventors: Martin Bruse, Stockholm (SE); Matthew Sharifi, Kilchberg (CH)

(73) Assignee: Google LLC, Mountain View, CA (US)

(*) Notice: Subject to any disclaimer, the term of this patent is extended or adjusted under 35 U.S.C. 154(b) by 386 days.

(21) Appl. No.: 18/124,914

(22) Filed: Mar. 22, 2023

(65) Prior Publication Data
US 2024/0319859 A1   Sep. 26, 2024

(51) Int. Cl.
| | | |
|---|---|---|
| *G06F 3/04847* | (2022.01) | |
| *G05B 19/10* | (2006.01) | |
| *G06F 1/26* | (2006.01) | |
| *G06F 1/3203* | (2019.01) | |
| *G06F 3/04842* | (2022.01) | |
| *G06F 3/16* | (2006.01) | |

(52) U.S. Cl.
CPC ....... *G06F 3/04847* (2013.01); *G05B 19/106* (2013.01); *G06F 1/26* (2013.01); *G06F 1/3203* (2013.01); *G06F 3/04842* (2013.01); *G06F 3/167* (2013.01)

(58) Field of Classification Search
CPC ...... G06F 3/04847; G06F 1/26; G06F 1/3203; G06F 3/04842; G06F 3/167; G06F 9/4893; G05B 19/106

USPC ........................................... 700/17; 713/300
See application file for complete search history.

(56) References Cited

U.S. PATENT DOCUMENTS

| | | |
|---|---|---|
| 2011/0202198 A1 | 8/2011 | Venkatakrishnan |
| 2018/0190276 A1* | 7/2018 | Bhaya ................. G06F 3/16 |
| 2019/0122132 A1 | 4/2019 | Rimini et al. |
| 2020/0082289 A1 | 3/2020 | Swierc |
| 2021/0234723 A1 | 7/2021 | Madden |

(Continued)

OTHER PUBLICATIONS

European Patent Office, Intention to Grant issued in Application No. 23751164.7; 41 pages; dated Nov. 21, 2024.

(Continued)

*Primary Examiner* — Michael J Brown
(74) *Attorney, Agent, or Firm* — Gray Ice Higdon

(57) ABSTRACT

Implementations set forth herein relate to an automated assistant that can control a sequence of operations for a routine according to whether power data indicates that energy expense and/or energy consumption can be preserved by modifying the sequence of operations for the routine. In some implementations, the automated assistant can suggest certain routines, and/or triggering conditions for operations of the routine, to reduce energy expense and/or energy consumption. Alternatively, or additionally, the automated assistant can infer certain operation requests or triggering conditions depending on whether the user has expressed an interest in preserving energy resources and expenses. In this way, the automated assistant can facilitate minimizing energy consumption and/or energy expenses without necessitating that the user exclusively, or manually, schedule all assistant operations with particularity.

17 Claims, 5 Drawing Sheets

(56) References Cited

U.S. PATENT DOCUMENTS

2022/0406301 A1    12/2022    Barros

OTHER PUBLICATIONS

European Patent Office; International Search Report and Written Opinion issued in Application No. PCT/US2023/027388; 13 pages; dated Aug. 28, 2023.
Khan et al., "Real-Time Scheduling of Operational Time for Smart Home Appliances Based on Reinforcement Learning" Digital Object Identfier, 10.1109/ACCESS.2020.30044151, 15 pages, dated Jul. 2, 2020.
Punitha et al., "Smart Home Power Management and Prediction System for Assisted Living" vol. 3, Issue 4, 4 pages, dated Apr. 2018.
Magyar et al., "Cost-optimal model predictive scheduling of home appliances ** This research is supported by the National Research, Development and Innovation Office-NKFIH through grant No. 11569 . . . " IFAC-PapersOnLine, 7 pages, DOI:10.1016/j.ifacol.2017.08.519, dated Apr. 2017.
Thangaraj, Rajesh, "Home Automation Using Smartphone Application" International Journal of Advanced Research in Engineering & Technology, 9 pages, dated Mar. 2017.
European Patent Office, Communication issued in Application No. 25164954.7, 11 pages, dated Jul. 24, 2025.

\* cited by examiner

PROACTIVE MODIFICATION OR SUGGESTION OF ASSISTANT ROUTINES BASED ON ANTICIPATED ENERGY CONSUMPTION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, an automated assistant may control performance of routines, which can involve executing a sequence of operations. However, because a routine may have an established order of execution, the automated assistant may not be able to modify the routine once the routine has been adopted. This can prove inefficient in circumstances in which a routine involves controlling devices that may be relatively costly to operate, at least from an energy perspective. For example, charging a vehicle and preheating an oven can be energy expensive tasks and, when they are part of an assistant routine, they may cause energy expenses to be relatively increased depending on when these operations are executed. In some instances, merely performing certain operations concurrently can result in reduced power availability for other devices (e.g., a coffee maker), thereby extending the time in which other devices take to perform certain tasks. Therefore, strictly defaulting to a predetermined arrangement of operations for a routine can prove inefficient given how variable energy consumption and energy rates are from home to home.

SUMMARY

Implementations set forth herein relate to an automated assistant that can coordinate and/or suggest operations and/or routines to be orchestrated in a manner that reduces anticipated power consumption, such as during times when utility rates are increased relative to other times. For example, in some implementations, the automated assistant can, in response to receiving a command to perform a routine, suggest a modification of operations of the routine that causes an energy-consuming operation of the routine to be performed according to a modified sequence that differs from an unmodified sequence in which the routine may have been initially configured. This modified sequence can be determined based on power data available to the automated assistant, and can reduce energy consumption for the user relative to executing the routine according to the unmodified sequence and/or reduce strain on a power grid to which devices to be controlled, as part of the routine, are connected.

For instance, the user can interact with the automated assistant to cause the automated assistant to perform a "Prepare to Bake" routine in which the automated assistant will (1) turn on smart kitchen lights, (2) preheat a smart networked oven oven to 375° F., and (3) play French dinner music. However, depending on when the user provides the command (e.g., "Assistant, prepare to bake."), and the power data available to the automated assistant, the automated assistant can perform the routine in a modified sequence. For example, when power data indicates that preheating the smart networked oven should be delayed by 15 minutes to reduce energy expenses, the automated assistant can cause the routine to be performed in a modified sequence such as: (1) playing French dinner music, (2) turning on the smart kitchen lights, and then (3) preheating the smart networked oven to 375° F. after a 15 minute delay from when the usually initially provided the command to initiate the routine. In some implementations, the automated assistant can expressly notify the user of the change to the sequence of the routine (e.g., "With your permission, I'll delay preheating the smart networked oven for 15 minutes to take advantage of an anticipated reduction in energy expense rate. Please confirm."). Alternatively, or additionally, the user can control a setting of the automated assistant that permits the automated assistant to proactively modify routines and without the user having to explicitly authorize the modification of the routine each time.

In some implementations, the automated assistant can suggest routines and/or commands for a user to provide to the automated assistant in furtherance of saving energy expenses. For example, the user can have an electric car charger and an electric washing machine that each have corresponding applications and/or can otherwise interact with an automated assistant. The automated assistant can determine, based on power data that characterizes prior usage of these smart networked devices (e.g., the electric car charger and the electric washing machine in this example), that not charging an electric car using the electric car charger while running the electric washing machine can reduce energy expenses. Based on this determination, the automated assistant can render a suggestion for the user in response to the user plugging the electric car charger into their car, starting the electric washing machine, and/or otherwise being available to interact with the automated assistant (and optionally with prior permission from the user). For example, as the electric car charger is charging the electric car, the user may start their electric washing machine and, in response, a nearby standalone speaker device can provide an assistant output such as, "When you say, 'Plan my vehicle charging,' I will throttle charging your vehicle until any other energy consuming devices, such as your washing machine, complete their operations." Alternatively, the automated assistant can cause the standalone speaker device to provide an output such as, "I can reduce your energy expenses by throttling your car charging until the washing machine completes the cycle. Please say 'confirm' if you'd like me to do this now and in the future." In this way, the user is provided with additional commands that can be utilized to save energy expenses when the user is controlling, or considering controlling, a particular device such as their electric car and/or washing machine. Moreover, this can allow the automated assistant to orchestrate the energy consumption of various devices associated with a user based on prior usage history and other power data.

In some implementations, power settings associated with the automated assistant can be controlled via a graphical user interface (GUI) and/or voice interactions with the automated assistant. For example, an assistant GUI can include options for modifying settings of an existing assistant operation and/or routine in furtherance of reducing energy expenses for the user. As another example, the assistant GUI can include options for creating an assistant routine in furtherance of reducing energy expenses for the user. The assistant GUI can include a setting for a threshold energy expense rate and/or threshold energy consumption, thereby allowing the routine and/or operation to be controlled according to available power data that indicates expense rate and/or energy consumption. For example, the assistant GUI can allow a user to select to initialize a routine and/or operation when an energy expense rate is at or near a particular value, which can dynamically change over a period of time (e.g., dynamically change throughout the course of a day or several days). Alternatively, or additionally, the assistant GUI can allow a user to select to initialize a routine and/or operation according to whether a triggering condition (e.g., a temporal triggering condition) has been satisfied. Alternatively, or additionally, the assistant GUI can allow a user to select to schedule, make dependent upon a condition(s), and/or otherwise modify a sequence of an operation according to other factors such as weather, an operation of another device, an operation of another application, a change in energy consumption, a change in energy rates, an amount of light detected, and/or any other factors that can be used to select when to control an operation and/or routine of an application(s) and/or a device(s).

The above description is provided as an overview of some implementations of the present disclosure. Further description of those implementations, and other implementations, are described in more detail below.

DETAILED DESCRIPTION

Figure 1A:
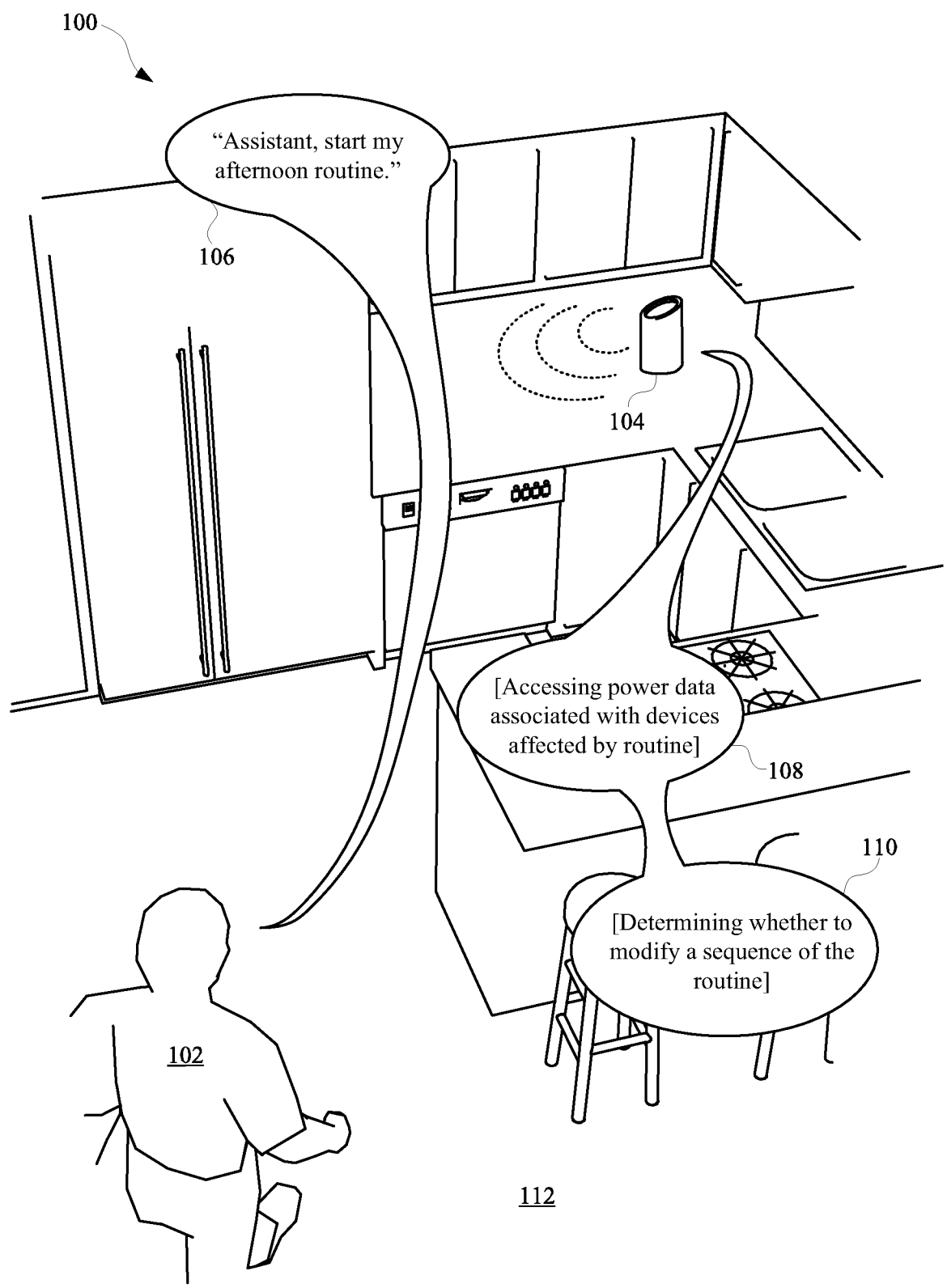
FIG. 1A and FIG. 1B illustrate views of a user causing an automated assistant to determine a sequence for a routine that results in less energy expense and/or consumption.
Figure 1B:
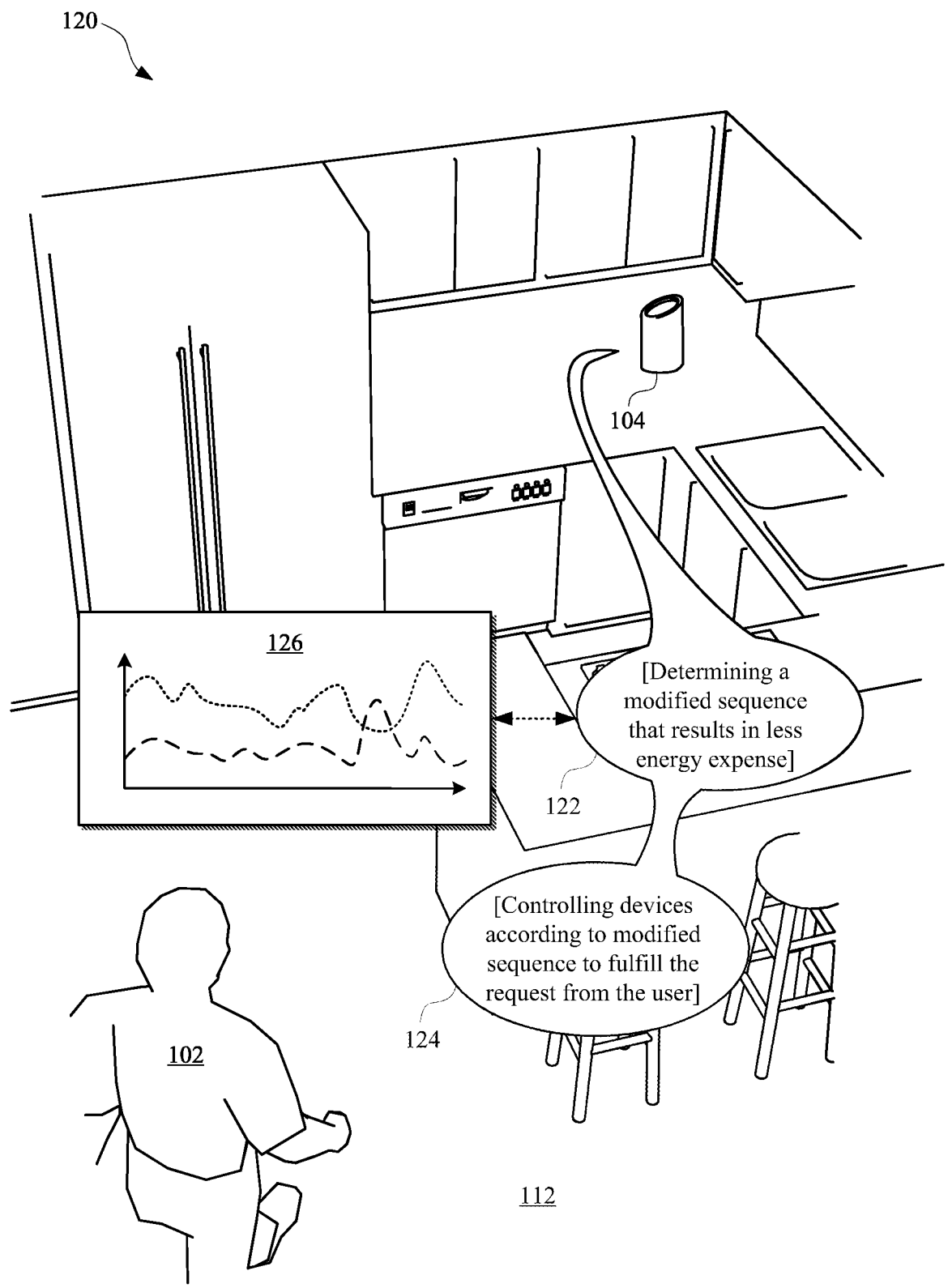

FIG. 1A and FIG. 1B illustrate a view 100 and a view 120 of a user 102 causing an automated assistant to determine a sequence for a routine that results in less energy expense and/or consumption. Initially, the user 102 can provide a spoken utterance 106 such as, "Assistant, start my afternoon routine," which can refer to a routine involving multiple different operations being controlled by the automated assistant. As one non-limiting example, the routine can include causing a furnace to increase in heat output and an oven to preheat for the user 102 to be able to start making their dinner. In response to the automated assistant receiving the spoken utterance 106 at an assistant enabled device and/or another smart networked device, such as a computing device 104, the automated assistant can perform an operation 108 of accessing power data associated with devices affected by the routine. For example, the power data can be available from one or more smart devices in the home 112 of the user 102, and/or via one or more other sources such as the internet, a publication by a local or regional power company, a publication for a government organization that regulates power, etc. The automated assistant can utilize the power data to perform an operation 110 of determining whether to modify a sequence of the routine requested by the user 102.

In some implementations, the automated assistant can determine to modify a sequence of the routine and/or suggest an alternative routine based on whether the power data indicates a non-renewable or renewable source of energy will be supplying an increased amount of energy to a corresponding power grid. Alternatively, or additionally, the automated assistant can determine to modify a sequence of the routine and/or suggest an alternative routine based on whether a change in energy expense rate and/or energy consumption rate is anticipated to affect the routine and/or an overall energy expense of the user 102.

In some implementations, the power data can include trend data 126 that can indicate changes to sources of energy over time and/or energy expense rates over time, as illustrated in view 120 of FIG. 1B. This temporal data can be utilized by the automated assistant to plan performance of certain operations such that the operation will consume energy at a time when an energy expense rate is relatively low and/or at a threshold expense rate. For example, the operation of increasing a heat output of a furnace of the "afternoon routine" can be delayed until a time in which a price of natural gas is anticipated to be relatively low compared to other times in the day. When the automated assistant has completed an operation 122 of determining a modified sequence that results in less energy expense, the automated assistant can then execute the routine according to the modified sequence. For example, an operation 124 of controlling devices according to the modified sequence to fulfill the request can be initialized. In some implementations, the automated assistant can initialize performance of a modified routine that includes and/or excludes one or more operations that may otherwise be performed when fulfilling the request. The inclusion or exclusion of certain operations can be based on the power data and/or whether modifying the routine will result in changes in energy expense and/or consumption. However, it should be understood that the user 102 can override the modified routine by providing a voice command or other input to otherwise override the modified routine. By overriding the modified sequence, the automated assistant can cause the sequence of operations of the routine to revert back to the unmodified sequence of operations.

Figure 2:
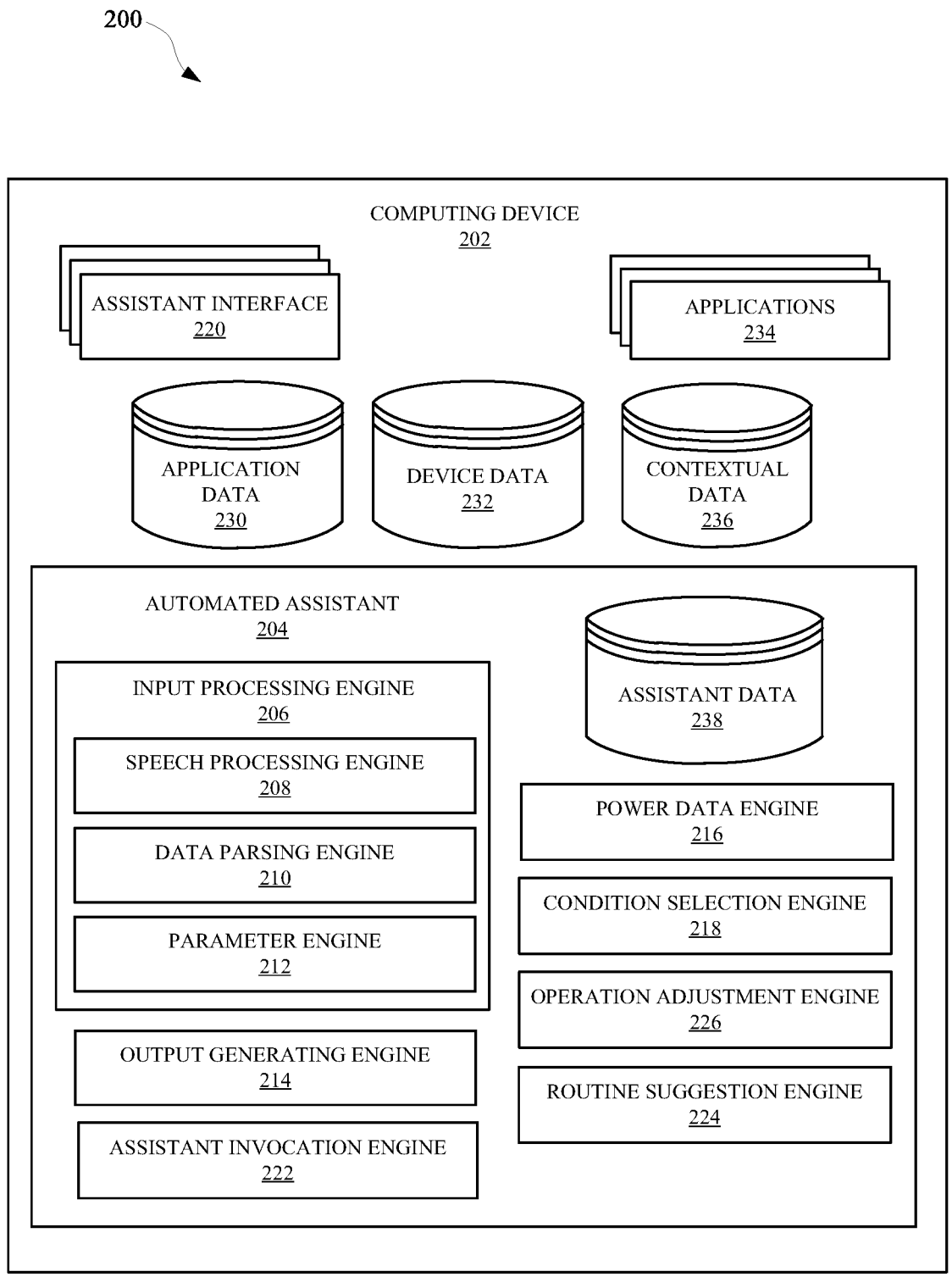
FIG. 2 illustrates a system that provides an automated assistant that can coordinate and/or suggest operations and/or routines to be orchestrated in a manner that preserves power during times when utility rates are increased relative to other times.

FIG. 2 illustrates a system 200 that provides an automated assistant that can coordinate and/or suggest operations and/or routines to be orchestrated in a manner that preserves power during times when utility rates are increased relative to other times. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, a state of one or more peripheral devices which the automated assistant 204 can control (e.g., smart networked devices), and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs and/or other user requests from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data (e.g., using an automatic speech recognition (ASR) model). The audio data can be transmitted from, for example, the computing device 202 to the server device in order to preserve computational resources at the computing device 202 (e.g., server-based ASR). Additionally, or alternatively, the audio data can be exclusively processed at the computing device 202 (e.g., on-device ASR).

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234 or with one or more smart networked devices that are communicatively coupled with the computing device 202.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no or fewer client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective smart networked device that is associated with one or more of the applications 234. A device state engine of the automated assistant 204 and/or the computing device 202 can access device data 232 to determine one or more actions capable of being performed by the computing device 202 and/or one or more smart networked devices that are controllable based on commands provided by the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on the contextual data 236— which would otherwise cause the automated assistant 204 to be invoked if the assistant suppressing output was not being detected.

In some implementations, the system 200 can include a power data engine 216 that can access power data from one or more different sources in furtherance of determining anticipated energy expenses and/or consumption associated with one or more devices and/or applications. For example, the power data can be accessed by the automated assistant 204 over the internet from a third party, such as a local or regional utility company or a governmental organization, and the automated assistant 204 can correlate the power data to historical usage data for one or more devices and/or applications controllable by the automated assistant 204. In this way, the automated assistant 204 can determine the applications and/or smart networked devices that may affect an energy expense of the user, and/or any conditions of operating the smart networked devices that may affect the energy expenses. For example, other data accessible to the automated assistant 204 such as weather data, usage data, traffic data, news, and/or any other information can be correlated to the power data to determine any particular conditions that can cause changes to energy expense rates. The automated assistant 204 can then generate correlation data for making decisions regarding how to modify any operations and/or routines for preserving energy expenses for a user.

In some implementations, the system 200 can include a condition selection engine 218 that can utilize any correlations determined by the power data engine 216 to identify conditions for triggering certain routines and/or operations, in furtherance of preserving energy expenses. For example, a triggering condition can include an energy expense rate for a particular source of energy (e.g., gas, electric, etc.) reaching a particular expense threshold. Therefore, the automated assistant 204 can determine to trigger certain routines and/or operations of a routine according to whether an energy expense rate has reached a particular threshold and/or suggest adding an energy expense rate trigger condition to a routine during creation thereof. Alternatively, or additionally, automated assistant can select a duration of time for controlling an operation and/or a routine based on a triggering condition (e.g., based on an utterance of "wash my clothes today" and determining to wash the clothes when an energy expense rate has crossed (e.g., fallen below) a particular threshold during the day). In this way, the automated assistant 204 can proactively generate routines, sequences, and/or schedules for operations that rely on triggering conditions that may be contingent upon not only temporal data, but additionally, or alternatively, contingent upon an anticipated energy expense rate. For instance, the automated assistant 204 can include anticipated energy expense rates for operating corresponding smart networked devices at certain times of the day or days of the week to better inform the user of the anticipated energy expense rates when creating a routine that includes one or more of the smart networked devices.

In some implementations, the system 200 can include an operation adjustment engine 226 that can be utilized to select and/or infer, based on power data obtained via the power data engine 216, one or more operations and/or smart networked devices to be utilized to satisfy a request from a user. For example, a user can provide a request for the automated assistant 204 to perform a particular routine and, in response, the automated assistant 204 can determine estimated energy expenses for performing the routine with different smart networked devices. The operation adjustment engine 226 can select a subset of smart networked devices from a plurality of smart networked devices for performing a routine and/or operation based on the correlations and/or power data analyzed by the power data engine 216. For example, the user can provide a request for the automated assistant 204 to perform a routine that involves a default subset of smart networked devices. However, based on the power data, and/or prior permission granted by the user, the automated assistant 204 can infer a selection of a different subset of smart networked devices to perform the routine. This different subset of smart networked devices can be selected based on an anticipated energy expense and/or anticipated energy consumption of the subset of the plurality of devices. In other words, the automated assistant 204 can balance the desired operations and/or smart networked devices to be controlled as part of the routine with anticipated energy expenses, and suggest creation of new routines and/or modification of existing routines based thereon.

In some implementations, the system 200 can include a routine suggestion engine 224 that can proactively generate routines (e.g., a routine can be a sequence of one or more operations controlled by the automated assistant 204) based on power data and/or in furtherance of mitigating energy expenses for the user. In some implementations, the routine suggestion engine 224 can determine, with prior permission from the user, a series of historical interactions that have occurred between the user and one or more applications and/or smart networked devices. Based on this determination, the routine suggestion engine 224 can determine whether modifying a temporal duration and/or schedule for these application and/or device interactions would result in a reduction in energy expenses and/or usage of "greener" energy sources. When the routine suggestion engine 224 determines that a series of interactions could be controlled as part of a routine, and according to a schedule that reduces energy expense, the routine suggestion engine 224 can cause the automated assistant 204 to suggest the routine to the user. In other words, the automated assistant 204 can provide natural language content as a notification to the user, and the notification can indicate a command that, when provided by the user to the automated assistant 204, can cause the automated assistant 204 to perform the expense preserving routine.

Figure 3:
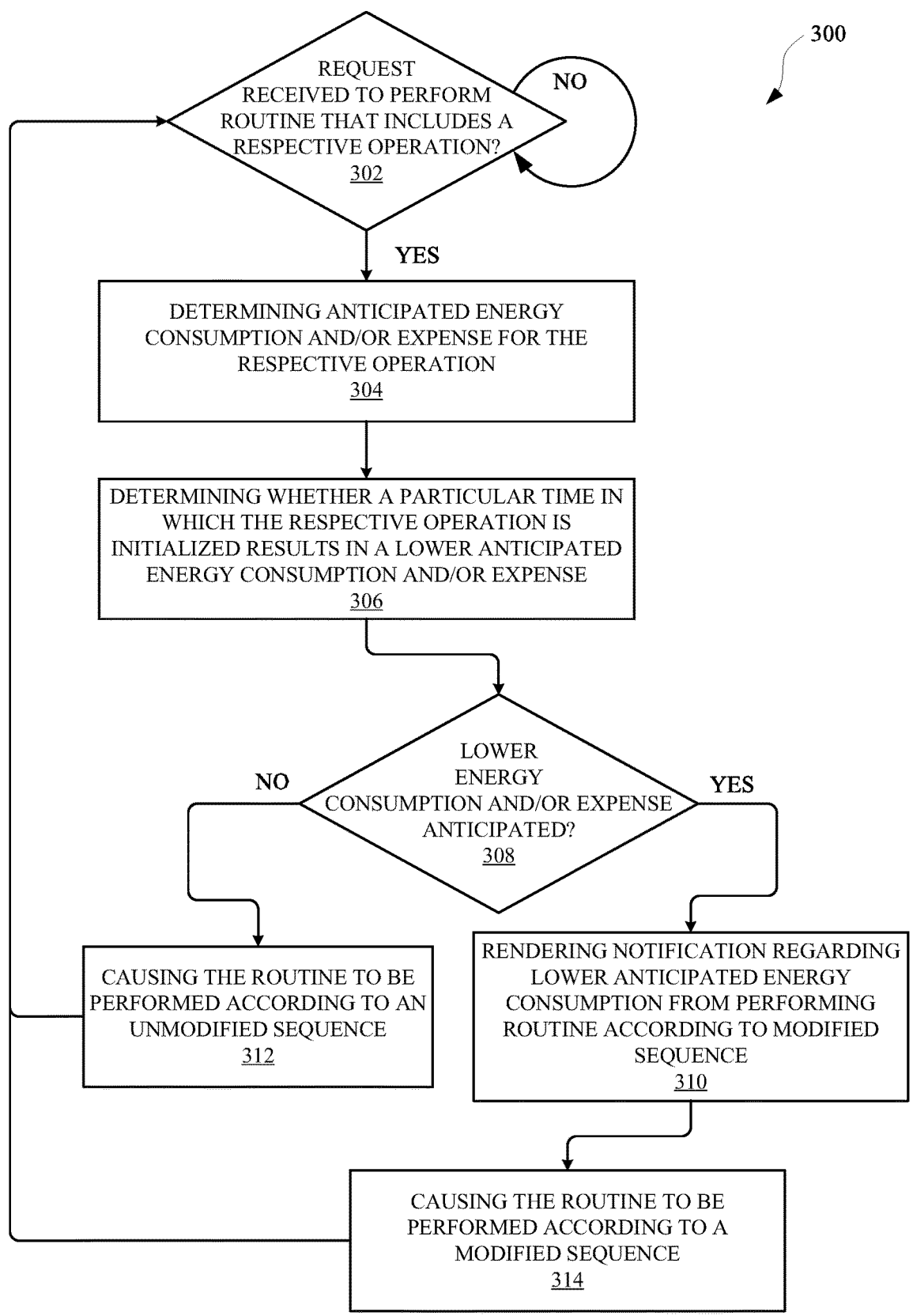
FIG. 3 illustrates a method for controlling an automated assistant to modify a routine and/or schedule of an operation according to power data and in furtherance of reducing energy expenses for a user.

FIG. 3 illustrates a method 300 for controlling an automated assistant to modify a routine and/or schedule of an operation according to power data, and in furtherance of reducing energy expenses for a user. The method 300 can be performed by one or more applications, devices, and/or any other apparatus or module capable of interacting with an automated assistant. The method 300 can include an operation 302 of determining whether a request was received to perform a routine that includes a respective operation. The request can be a spoken utterance such as, "Assistant, good morning," which can refer to a routine in which the automated assistant controls various smart networked devices, such as starting a coffee maker, safely preheating a toaster oven, and playing a news podcast at a nearby speaker device. When the automated assistant determines that the request has been received, the method 300 can proceed from the operation 302 to an operation 304.

The operation 304 can include determining an anticipated energy consumption and/or expense for the respective operations. For example, power data can be available to the automated assistant for indicating an energy expense rate for any energy consumed by the smart networked devices controlled during execution of the routine. Alternatively, or additionally, the power data can indicate historical usage data from which the automated assistant can determine how much energy is typically consumed by each smart networked device during performance of the routine. In some implementations, the automated assistant can determine estimated energy expenses and/or consumption based on the power data and in response to receiving the request. The method 300 can proceed from the operation 304 to an operation 306.

The operation 306 can include determining whether a particular time in which the respective operation is initialized results in a lower anticipated energy consumption and/or expense. For example, the automated assistant can estimate energy consumption and/or expense for modified sequences for a routine and/or a modified schedule for the routine, thereby allowing the automated assistant to determine how to most efficiently execute the routine. For example, a modified sequence (e.g., playing the news podcast to completion before preheating the oven) for a routine can be selected based on a change in expense rate for electricity, as indicated by power data, and/or an estimated spike in demand that is occurring when the automated assistant receives the request. The method 300 can proceed from the operation 306 to an operation 308, which can include determining whether lower energy consumption and/or rate would be anticipated for a modified sequence and/or schedule for a routine and/or operation.

When the automated assistant determines that a lower energy consumption and/or expense is not anticipated for a modified sequence and/or schedule for fulfilling the request, the method 300 can proceed from the operation 308 to an operation 312. The operation 312 can include causing the routine and/or operation to be performed according to an unmodified sequence and/or schedule. In other words, the automated assistant may have determined that any modification to a sequence or schedule for fulfilling the request would not result in a reduction in energy consumption and/or expense, therefore the automated assistant would execute the routine and/or operation according to existing settings and/or defaults. However, when the automated assistant determines that lower and/or "greener" energy consumption and/or expense is anticipated for a modified sequence and/or schedule, the method 300 can proceed from the operation 308 to an operation 310. In some implementations, the automated assistant can determine whether performing a routine or operation at a particular time would result in consumption of energy that is being generated from more renewable sources. For example, the power data can indicate when wind and/or solar energy sources are supplying electricity to a grid in which certain devices are powered and, based on this information, select to perform certain operations and/or routines in a way that maximizes usage of these "greener" sources.

In some implementations, the operation 310 can be an optional operation that includes rendering a notification regarding lower anticipated energy consumption from performing a routine according to a modified sequence. The notification can be optionally rendered to provide the user with an opportunity to confirm the modification to the routine. For example, the automated assistant can determine to schedule the preheating of the toaster oven after the coffee maker has completed making coffee, and this modification can be provided in a natural language prompt that the user can select to confirm via touch input and/or voice input. The method 300 can optionally proceed from the operation 310 and/or the operation 308 to an operation 314, which can include causing the routine to be performed according to the modified sequence and/or schedule. In this way, the automated assistant can preserve energy resources and/or expenses for the user, without requiring the user to manually access the power data, compute expense estimates, and/or modify a schedule of operations. Rather, the user can rely on backend operations of the automated assistant to determine energy efficient sequences for routines.

Figure 4:
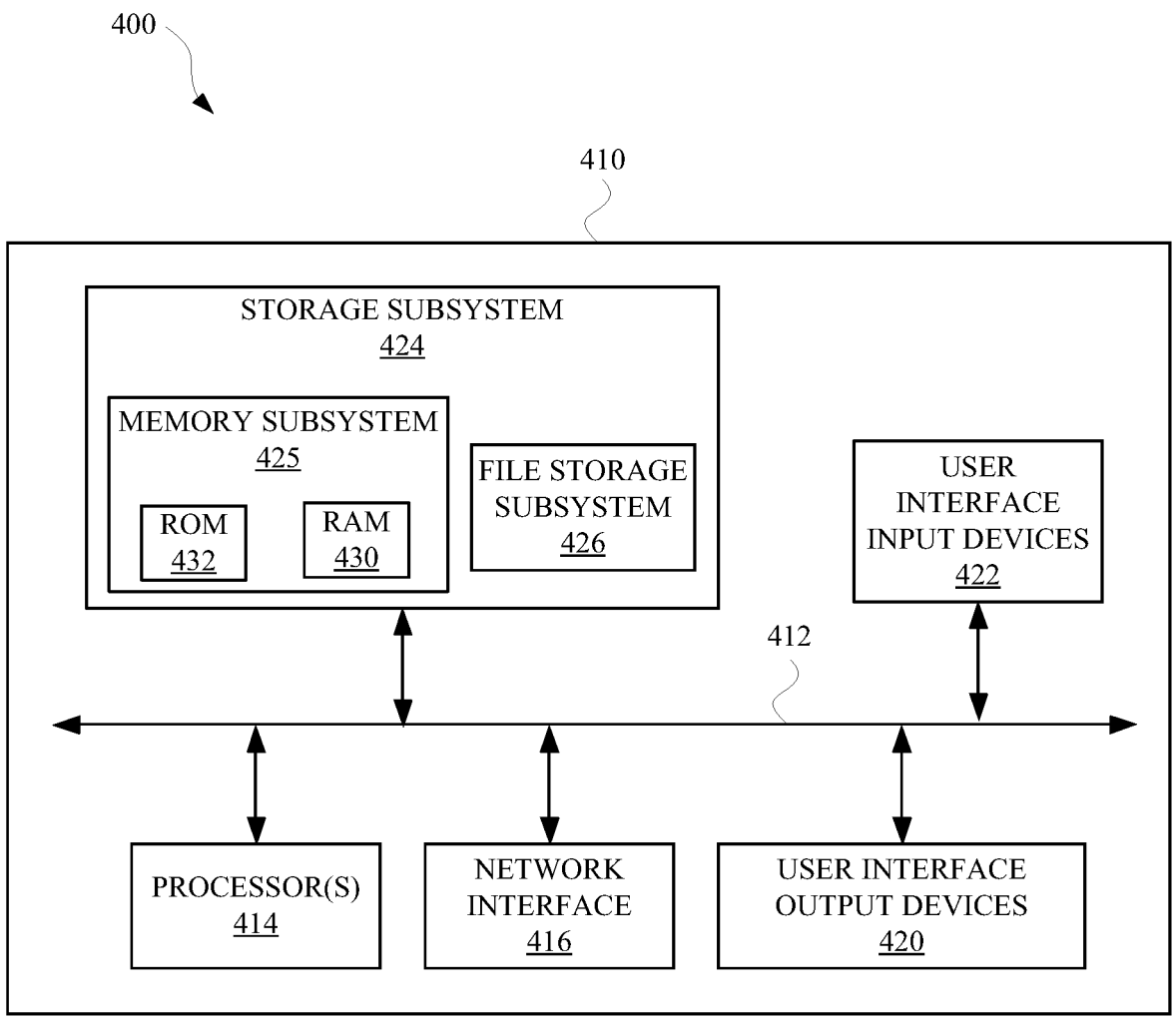
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, automated assistant, computing device 104, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes determining, by an automated assistant, to perform a routine that involves controlling multiple different operations performed by the automated assistant and/or one or more other applications. The automated assistant is executed at least in part at a computing device of a user. The method further includes accessing, in response to determining to perform the routine, power data that provides information for determining anticipated energy consumption of operating a smart networked device that is active during performance of one or more operations of the multiple different operations of the routine; determining, based on the power data, whether modifying performance of the one or more operations according to a modified sequence results in lower anticipated energy consumption relative to performing the one or more operations according to an unmodified sequence for the routine; and in response to determining that modifying performance of the one or more operations according to the modified sequence results in the lower anticipated energy consumption: causing the automated assistant to initialize performance of the routine in accordance with the modified sequence for the one or more operations of the routine.

These and other implementations of technology disclosed herein can optionally include one or more of the following features.

In some implementations, the method can further include: in response to determining that modifying performance of the one or more operations according to the modified sequence results in the lower anticipated energy consumption: causing an interface of the computing device to render an output that characterizes natural language content for indicating the modified sequence for the one or more operations of the routine to the user, and receiving, by the automated assistant, a user input that indicates permission from the user for the automated assistant to initialize performance of the routine in accordance with the modified sequence for the one or more operations of the routine. In these implementations, causing the automated assistant to initialize performance of the routine is performed in response to the user input.

In some implementations, the power data can indicate an anticipated energy consumption rate of operating the smart networked device during the one or more operations. In these implementations, determining whether modifying performance of the one or more operations according to the modified sequence for the routine results in the lower anticipated energy consumption can include determining whether the anticipated energy consumption rate satisfies an energy consumption threshold.

In some implementations, the method can further include: determining, prior to causing the automated assistant to initialize performance of the routine, that the user or another user of the computing device has selected a setting of an assistant graphical user interface (GUI) for permitting the automated assistant to modify sequences of routines based on an anticipated energy consumption rate.

In some implementations, causing the automated assistant to initialize performance of the routine in accordance with the modified sequence can include controlling a first smart networked device before controlling a second smart networked device. In these implementations, the unmodified sequence can include controlling the second smart networked device before controlling the first smart networked device.

In some implementations, the method can further include: in response to determining that performing the one or more operations according to the modified sequence results in the lower anticipated energy consumption: causing the automated assistant to render an output via an interface of the computing device. In these implementations, the output can include natural language content that characterizes an estimated difference in energy consumption of the modified sequence relative to the unmodified sequence.

In some implementations, determining to perform the routine can include: receiving, by the automated assistant, a user request from the user to perform the routine that involves controlling the multiple different operations performed by the automated assistant and/or one or more of the other applications. In these implementations, accessing the power data that provides the information for determining the anticipated energy consumption of operating the smart networked device can be in response to receiving the user request. Further, in these implementations, determining whether modifying performance of the one or more operations according to the modified sequence results in the lower anticipated energy consumption relative to performing the one or more operations according to the unmodified sequence for the routine can be further based on the user request.

In some implementations, determining to perform the routine that involves controlling the multiple different operations performed by the automated assistant and/or one or more of the other applications can be based on determining that one or more routine triggering conditions are satisfied.

In some versions of those implementations, the one or more routine triggering conditions can include at least a temporal triggering condition for the routine. In these implementations, modifying performance of the one or more operations according to the modified sequence can include modifying the temporal triggering condition for the routine.

In some further versions of those implementations, modifying the temporal triggering condition for the routine can include delaying immediate performance of the routine.

In some implementations, a method implemented by one or more processors is provided, and includes receiving, by an automated assistant, a user request to create a routine that involves controlling multiple different operations performed by the automated assistant and/or one or more other applications. The automated assistant is executed at least in part at a computing device of a user. The method further includes accessing, in response to receiving the user request to create the routine, corresponding power data that indicates anticipated energy consumption of operating each of a plurality of smart networked devices over different durations of time, each of the plurality of smart networked devices being controllable by the automated assistant as part of the routine; causing an interface of the computing device to render an output that characterizes the power data for each of the corresponding smart networked devices that are controllable by the automated assistant as part of the routine; receiving, by the automated assistant, a user selection of a subset of smart networked devices, from among the plurality of smart networked devices, for inclusion in the routine; and generating, based on the user selection of the subset of smart networked devices, the routine that, when executed, causes the automated assistant to perform one or more operations in furtherance of controlling the smart networked devices of the subset of the smart networked devices.

These and other implementations of technology disclosed herein can optionally include one or more of the following features.

In some implementations, the method can further include receiving, by the automated assistant, one or more routine triggering conditions for the routine that, when satisfied, cause the automated assistant to execute the routine.

In some versions of those implementations, the one or more routine triggering conditions can include an anticipated energy consumption triggering condition for the routine that, when satisfied, causes the automated assistant to perform the one or more operations in furtherance of controlling the smart networked devices of the subset and over a given duration of time, of the different durations of time, when the anticipated energy consumption of the smart networked devices of the subset is lowest.

In some further versions of those implementations, the one or more routine triggering conditions can further include a temporal triggering condition for the routine that, when satisfied, causes the automated assistant to perform the one or more operations in furtherance of controlling the smart networked devices of the subset and over a first duration of time, of the different durations of time, or a second duration of time, of the different durations of time, wherein the given duration of time is one of the first duration of time or the second duration of time.

In some implementations, a method implemented by one or more processors is provided, and includes receiving, by an automated assistant, a user request for the automated assistant to control a smart networked device. The automated assistant is executed at least in part at a computing device of a user. The method further includes accessing, in response to receiving the user request for the automated assistant to control the smart networked device, power data that indicates anticipated energy consumption of operating the smart networked device over different durations of time; determining, based on the user request and based on the power data, a given duration of time, from among the different durations of time, to operate the smart networked device; and causing the smart networked device to operate during the given duration of time.

These and other implementations of technology disclosed herein can optionally include one or more of the following features.

In some implementations, the given duration of time can be associated with a lowest anticipated energy consumption relative to other durations of time, of the different durations of time, that are temporally distinct from the given duration of time.

In some implementations, the method can further include: determining, based on the smart networked device specified by the user request, whether to infer an additional user request for the automated assistant to control an additional smart networked device that is in addition to the smart networked device and that is not specified by the user request; and in response to determining to infer the additional user request: inferring the additional user request for the automated assistant to control the additional smart networked device that is in addition to the smart networked device and that is not specified by the user request.

In some versions of those implementations, the power data can further indicate additional anticipated energy consumption of operating the additional smart networked device over different durations of time.

In some further versions of those implementations, the method can further include: determining, based on the additional user request and based on the power data, a given additional duration of time, from among the different durations of time and that is in addition to the given duration of time, to operate the additional smart networked device; and causing the additional smart networked device to operate during the given additional duration of time.

In some additional or alternative versions of those implementations, inferring the additional user request for the automated assistant to control the additional smart networked device that is in addition to the smart networked device and that is not specified by the user request can include determining, based on historical smart networked device data, that the additional smart networked device is operated during temporally adjacent durations of time.

In some implementations, a method implemented by one or more processors is provided, and includes determining, by an automated assistant, one or more operations to control a smart networked device that can be initialized by the user via one or more applications and/or one or more devices. The one or more operations can be initialized by the user via the automated assistant and/or direct interaction with the one or more applications and/or the one or more devices. The method further includes determining, by the automated assistant, an anticipated energy consumption for a respective operation of the one or more operation. The anticipated energy consumption is determined based on power data that is available to the automated assistant. The method further includes determining, based on the anticipated energy consumption, whether a particular time in which the respective operation is initialized results in a lower anticipated energy consumption; in response to determining that the particular time in which the respective operation is initialized results in the lower anticipated energy consumption: generating natural language content that characterizes a suggestion for a command, that a user can provide to the automated assistant, to cause the automated assistant to initialize the one or more operations to control the smart networked device; and causing the automated assistant to render, for the user, an output that characterizes the natural language content in furtherance of notifying the user of the lower anticipated energy consumption that can be realized by providing the command at the particular time.

These and other implementations of technology disclosed herein can optionally include one or more of the following features.

In some implementations, causing the automated assistant to render the output can include: determining that the user is engaged in an ongoing interaction with the automated assistant; and causing the automated assistant to render the output as part of the ongoing interaction.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
    determining, by an automated assistant, to perform a routine that involves controlling multiple different operations performed by the automated assistant and/or one or more other applications,
       wherein the automated assistant is executed at least in part at a computing device of a user;
    accessing, in response to determining to perform the routine, power data that provides information for determining anticipated energy consumption of operating a smart networked device that is active during performance of one or more operations of the multiple different operations of the routine;
    determining, based on the power data, whether modifying performance of the one or more operations according to a modified sequence results in lower anticipated energy consumption relative to performing the one or more operations according to an unmodified sequence for the routine; and
    in response to determining that modifying performance of the one or more operations according to the modified sequence results in the lower anticipated energy consumption:
       causing the automated assistant to initialize performance of the routine in accordance with the modified sequence for the one or more operations of the routine, wherein causing the automated assistant to initialize performance of the routine in accordance with the modified sequence includes controlling a first smart networked device before controlling a second smart networked device, and wherein the unmodified sequence includes controlling the second smart networked device before controlling the first smart networked device.

2. The method of claim 1, further comprising:
    in response to determining that modifying performance of the one or more operations according to the modified sequence results in the lower anticipated energy consumption:
       causing an interface of the computing device to render an output that characterizes natural language content for indicating the modified sequence for the one or more operations of the routine to the user, and
       receiving, by the automated assistant, a user input that indicates permission from the user for the automated assistant to initialize performance of the routine in accordance with the modified sequence for the one or more operations of the routine,
          wherein causing the automated assistant to initialize performance of the routine is performed in response to the user input.

3. The method of claim 1,
    wherein the power data indicates an anticipated energy consumption rate of operating the smart networked device during the one or more operations, and
    wherein determining whether modifying performance of the one or more operations according to the modified sequence for the routine results in the lower anticipated energy consumption includes determining whether the anticipated energy consumption rate satisfies an energy consumption threshold.

4. The method of claim 1, further comprising:
    determining, prior to causing the automated assistant to initialize performance of the routine, that the user or another user of the computing device has selected a setting of an assistant graphical user interface (GUI) for permitting the automated assistant to modify sequences of routines based on an anticipated energy consumption rate.

5. The method of claim 1, further comprising:
    in response to determining that performing the one or more operations according to the modified sequence results in the lower anticipated energy consumption:
       causing the automated assistant to render an output via an interface of the computing device,
          wherein the output includes natural language content that characterizes an estimated difference in energy consumption of the modified sequence relative to the unmodified sequence.

6. The method of claim 1,
    wherein determining to perform the routine comprises receiving, by the automated assistant, a user request from the user to perform the routine that involves controlling the multiple different operations performed by the automated assistant and/or one or more of the other applications,
    wherein accessing the power data that provides the information for determining the anticipated energy consumption of operating the smart networked device is in response to receiving the user request, and
    wherein determining whether modifying performance of the one or more operations according to the modified sequence results in the lower anticipated energy consumption relative to performing the one or more operations according to the unmodified sequence for the routine is further based on the user request.

7. The method of claim 1, wherein determining to perform the routine that involves controlling the multiple different operations performed by the automated assistant and/or one or more of the other applications is based on determining that one or more routine triggering conditions are satisfied.

8. The method of claim 7,
    wherein the one or more routine triggering conditions include at least a temporal triggering condition for the routine, and
    wherein modifying performance of the one or more operations according to the modified sequence comprises modifying the temporal triggering condition for the routine.

9. The method of claim 8, wherein modifying the temporal triggering condition for the routine comprises delaying immediate performance of the routine.

10. A method implemented by one or more processors, the method comprising:
    receiving, by an automated assistant, a user request to create a routine that involves controlling multiple different operations performed by the automated assistant and/or one or more other applications,
       wherein the automated assistant is executed at least in part at a computing device of a user;
    receiving, by the automated assistant, one or more routine triggering conditions for the routine that, when satisfied, cause the automated assistant to execute the routine;
    accessing, in response to receiving the user request to create the routine, corresponding power data that indicates anticipated energy consumption of operating each of a plurality of smart networked devices over different durations of time, each of the plurality of smart networked devices being controllable by the automated assistant as part of the routine;

causing an interface of the computing device to render an output that characterizes the power data for each of the corresponding smart networked devices that are controllable by the automated assistant as part of the routine;

receiving, by the automated assistant, a user selection of a subset of smart networked devices, from among the plurality of smart networked devices, for inclusion in the routine;

generating, based on the user selection of the subset of smart networked devices, the routine that, when executed, causes the automated assistant to perform one or more operations in furtherance of controlling the smart networked devices of the subset of the smart networked devices; and in response to detecting the one or more triggering conditions for the routine:

causing the automated assistant to execute the routine.

11. The method of claim 10, wherein the one or more routine triggering conditions comprise an anticipated energy consumption triggering condition for the routine that, when satisfied, causes the automated assistant to perform the one or more operations in furtherance of controlling the smart networked devices of the subset and over a given duration of time, of the different durations of time, when the anticipated energy consumption of the smart networked devices of the subset is lowest.

12. The method of claim 11, wherein the one or more routine triggering conditions further comprise a temporal triggering condition for the routine that, when satisfied, causes the automated assistant to perform the one or more operations in furtherance of controlling the smart networked devices of the subset and over a first duration of time, of the different durations of time, or a second duration of time, of the different durations of time, wherein the given duration of time is one of the first duration of time or the second duration of time.

13. A method implemented by one or more processors, the method comprising:

receiving, by an automated assistant, a user request for the automated assistant to control a smart networked device, wherein the automated assistant is executed at least in part at a computing device of a user;

determining, based on the smart networked device specified by the user request, whether to infer an additional user request for the automated assistant to control an additional smart networked device that is in addition to the smart networked device and that is not specified by the user request;

in response to determining to infer the additional user request:

inferring the additional user request for the automated assistant to control the additional smart networked device that is in addition to the smart networked device and that is not specified by the user request;

accessing, in response to receiving the user request for the automated assistant to control the smart networked device, power data that indicates anticipated energy consumption of operating the smart networked device over different durations of time;

determining, based on the user request and based on the power data, a given duration of time, from among the different durations of time, to operate the smart networked device;

causing the smart networked device to operate during the given duration of time; and causing the additional smart networked device to operate during the given duration of time or a given additional duration of time.

14. The method of claim 13, wherein the given duration of time is associated with a lowest anticipated energy consumption relative to other durations of time, of the different durations of time, that are temporally distinct from the given duration of time.

15. The method of claim 13, wherein the power data further indicates additional anticipated energy consumption of operating the additional smart networked device over different durations of time.

16. The method of claim 15, further comprising:

determining, based on the additional user request and based on the power data, the given additional duration of time, from among the different durations of time and that is in addition to the given duration of time, to operate the additional smart networked device; and causing the additional smart networked device to operate during the given additional duration of time.

17. The method of claim 13, wherein inferring the additional user request for the automated assistant to control the additional smart networked device that is in addition to the smart networked device and that is not specified by the user request comprises:

determining, based on historical smart networked device data, that the additional smart networked device is operated during temporally adjacent durations of time.

* * * * *